United States Patent
Aizaki

(10) Patent No.: US 8,169,475 B2
(45) Date of Patent: May 1, 2012

(54) IMAGE PROCESSING SYSTEM, IMAGING SYSTEM, AND MICROSCOPE IMAGING SYSTEM

(75) Inventor: Shinichiro Aizaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 793 days.

(21) Appl. No.: 12/345,898

(22) Filed: Dec. 30, 2008

(65) Prior Publication Data

US 2009/0141127 A1 Jun. 4, 2009

(51) Int. Cl.
*H04N 7/18* (2006.01)
*G06K 9/00* (2006.01)
*G09G 5/02* (2006.01)

(52) U.S. Cl. .............. 348/79; 348/222.1; 348/229.1; 345/589; 345/601; 345/602; 358/500; 358/505; 358/518; 358/509; 358/501; 382/167; 382/274; 382/162; 382/267

(58) Field of Classification Search ............. 348/179, 348/222.1, 229.1
See application file for complete search history.

(56) References Cited

U.S. PATENT DOCUMENTS

| | | | | |
|---|---|---|---|---|
| 7,436,995 | B2 * | 10/2008 | Ito et al. | 382/162 |
| 7,830,566 | B2 * | 11/2010 | Yamada et al. | 358/518 |
| 2003/0030754 | A1 | 2/2003 | Tsukada | |
| 2005/0275911 | A1 * | 12/2005 | Yamada et al. | 358/518 |
| 2007/0211074 | A1 | 9/2007 | Yeung | |
| 2008/0018735 | A1 | 1/2008 | Aizaki et al. | |

FOREIGN PATENT DOCUMENTS

| | | |
|---|---|---|
| EP | 1 578 140 A2 | 9/2005 |
| JP | 2005-117612 A | 4/2005 |
| JP | 2005-210370 A | 8/2005 |
| JP | 2007-14010 A | 1/2007 |

OTHER PUBLICATIONS

Extended European Search Report dated Aug. 14, 2008 issued in counterpart European Appln. No. 06020627.3.
Extended European Search Report dated Mar. 31, 2009, issued in counterpart European Application No. 09000022.5.
European Office Action dated Dec. 18, 2009 (in English) issued in a counterpart European Application No. 09000022.5-1228.

* cited by examiner

*Primary Examiner* — Jude Jean Gilles
(74) *Attorney, Agent, or Firm* — Holtz, Holtz, Goodman & Chick, PC

(57) ABSTRACT

An image processing system comprising an image data acquisition unit for acquiring captured image data, with a first image processing unit for performing first image processing relating to color correction and gradation correction on the image data, a second image processing unit for performing second image processing relating to color correction based on a Color Appearance Model on the image data, a parameter calculation unit for calculating an image processing parameter used in the first image processing from the image data before the second image processing and the image data after the second image processing, and a control unit for setting the image processing parameter to the first image processing unit.

19 Claims, 9 Drawing Sheets

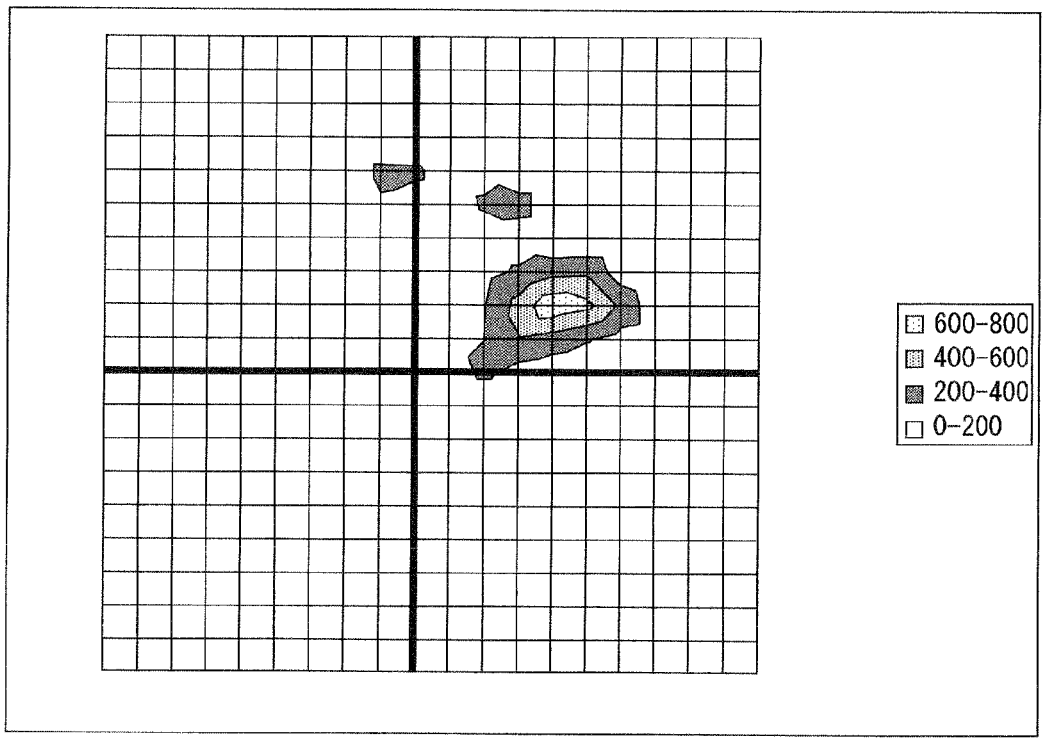
F I G. 5

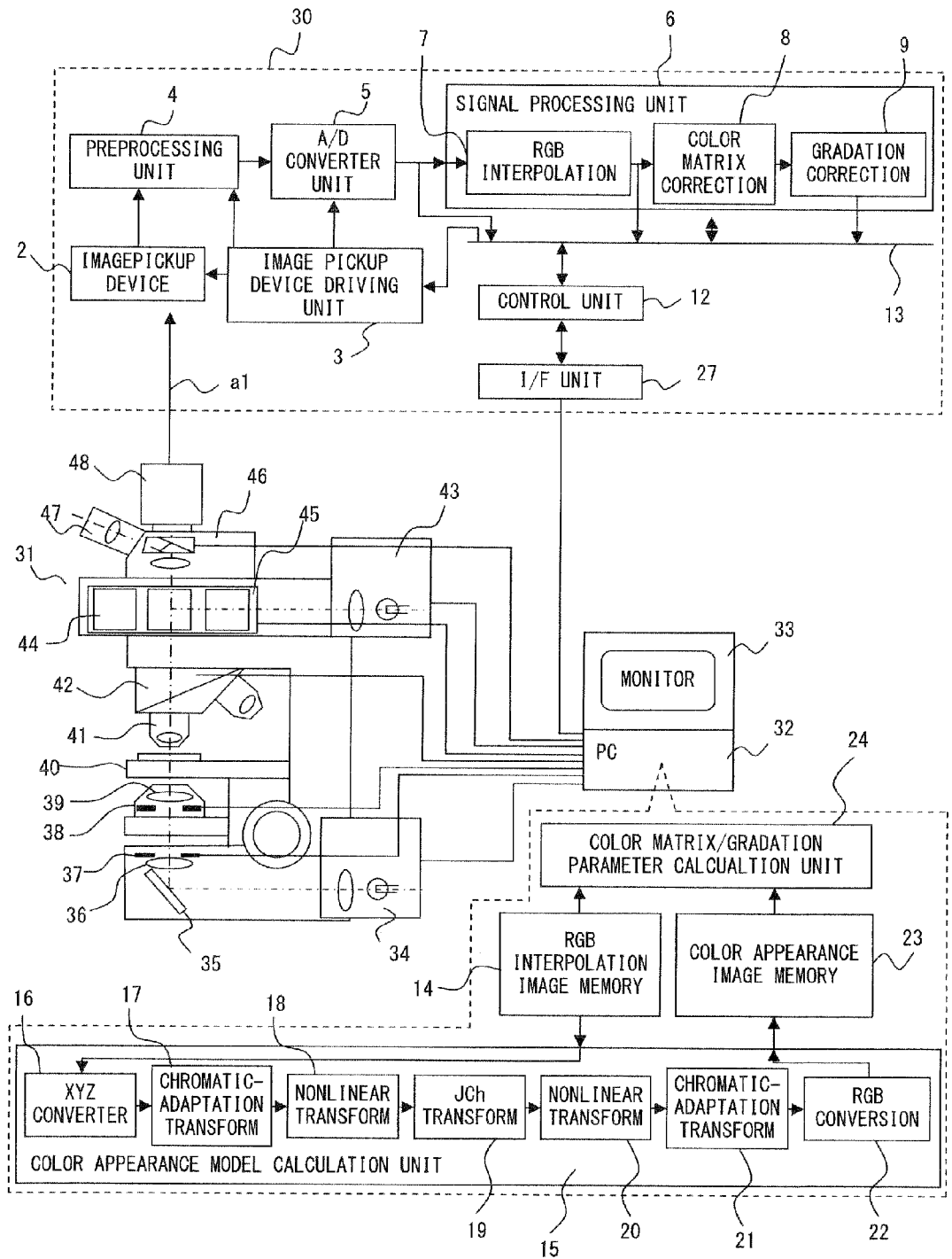
F I G. 7

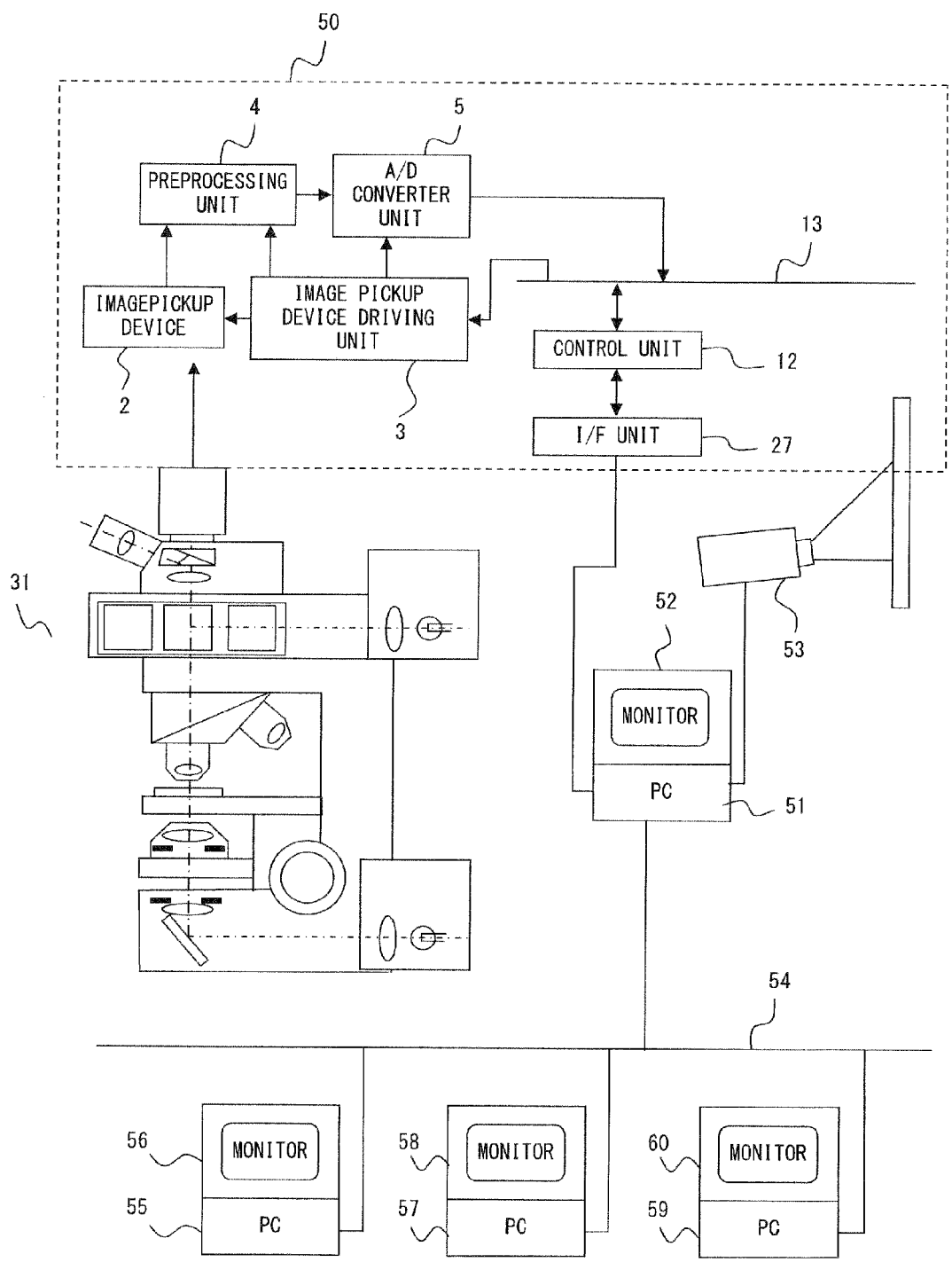
F I G. 8

IMAGE PROCESSING SYSTEM, IMAGING SYSTEM, AND MICROSCOPE IMAGING SYSTEM

CROSS REFERENCE TO RELATED APPLICATIONS

This application is based upon prior Japanese Patent Application No. 2007-174870, filed Jul. 3, 2007, the entire contents of which are incorporated herein by reference.

BACKGROUND OF THE INVENTION

1. Field of the Invention

The present invention relates to an imaging system and a microscope imaging system for capturing subject images or images observed with a microscope with an image pickup device such as a CCD, and for displaying and recording the images, and to an image processing system used in the above systems. The present invention particularly relates to color compensation processing and contrast correction processing of the systems.

2. Description of the Related Art

Conventionally, a method for colometrically improving color reproductivity by using tristimulus values of a subject in image processing systems, imaging systems, and microscope imaging systems has been widely known. However, because this method does not take human visual perception property into account, problems such as foggy images and differences in color from the original colors have been frequently pointed out.

Japanese Patent Application Publication No. 2005-117612 and Japanese Patent Application Publication No. 2005-210370 disclose techniques that are methods for improving the visual quality while taking the human visual perception property into account.

The techniques in these documents employ processing based on CIECAM02, which is a CIE Color Appearance Model (CIECAM) of the International Commission on Illumination (CIE), in order to improve the visual quality.

The processing based on the CIECAM02 is computed with the following formula. First, the observation environment is classified into three surrounds: Average, Dim, and Dark. Given that the luminance of the white color around the observation subject is $L_{SW}$, the luminance of the white color of the observation subject is $L_{DW}$, and $S_R = L_{SW}/L_{DW}$, the surround is Average at $S_R \geq 0.2$, is Dim at $0 \leq S_R < 0.2$, and is Dark at $S_R = 0$.

For each of the surrounds, c, Nc, and F are determined by the table below.

| Surround | c | Nc | F |
|---|---|---|---|
| Average | 0.69 | 1.0 | 1.0 |
| Dim | 0.59 | 0.9 | 0.9 |
| Dark | 0.525 | 0.8 | 0.8 |

In order to convert the tristimulus values XYZ into lightness J, Chroma C, and hue angle h by means of CIECAM02, the tristimulus values are first converted into RGB spaces with an MCAT02 matrix.

$$\begin{pmatrix} R \\ G \\ B \end{pmatrix} = M_{CAT02} \cdot \begin{pmatrix} X \\ Y \\ Z \end{pmatrix} \quad (1)$$

$$M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix} \quad (2)$$

The degree of incomplete chromatic adaptation D is calculated next.

$$D = F \cdot \left[ 1 - \left( \frac{1}{3.6} \right) \cdot \exp\left[ \frac{-(L_A + 42)}{92} \right] \right] \quad (3)$$

Chromatic adaptation is calculated by using D.

$$R_C = [(Y_W \cdot D/R_W) + (1-D)] \cdot R \quad (4)$$

$$G_C = [(Y_W \cdot D/G_W) + (1-D)] \cdot G \quad (5)$$

$$B_C = [(Y_W \cdot D/B_W) + (1-D)] \cdot B \quad (6)$$

Here, $R_W$, $G_W$, and $B_W$ are RGB values of the white color of an observation subject, and the white color tristimulus values $R_W$, $G_W$, and $B_W$ are multiplied with an $M_{CAT02}$ matrix.

Next, observation condition parameters are calculated.

$$k = 1/(5L_A + 1) \quad (7)$$

$$F_L = 0.2k^4(5L_A) + 0.1(1-k^4)^2(5L_A)^{1/3} \quad (8)$$

$$n = Y_b/Y_W \quad (9)$$

$$N_{bb} = N_{cb} = 0.725(1/n)^{0.2} \quad (10)$$

$$z = 1.48 + \sqrt{n} \quad (11)$$

The values obtained from Equation (4) through Equation (6) are converted into Hunt-Pointer-Estevez space.

$$\begin{pmatrix} R' \\ G' \\ B' \end{pmatrix} = M_{HPE} \cdot M_{CAT02}^{-1} \cdot \begin{pmatrix} R_C \\ G_C \\ B_C \end{pmatrix} \quad (12)$$

$$M_{HPE} = \begin{pmatrix} 0.38971 & 0.68898 & -0.07868 \\ -0.22981 & 1.18340 & 0.04641 \\ 0.00000 & 0.00000 & 1.00000 \end{pmatrix} \quad (13)$$

$$M_{CAT02}^{-1} = \begin{pmatrix} 1.096124 & -0.278869 & 0.182745 \\ 0.454369 & 0.473533 & 0.072098 \\ -0.009628 & -0.005698 & 1.015326 \end{pmatrix} \quad (14)$$

A nonlinear transform is applied to R', G', and B'.

$$R'_a = \frac{400(F_L R'/100)^{0.42}}{27.13 + \left( \frac{F_L R'}{100} \right)^{0.42}} + 0.1 \quad (15)$$

$$G'_a = \frac{400(F_L G'/100)^{0.42}}{27.13 + \left( \frac{F_L G'}{100} \right)^{0.42}} + 0.1 \quad (16)$$

$$B'_a = \frac{400(F_L B'/100)^{0.42}}{27.13 + (F_L B'/100)^{0.42}} + 0.1 \quad (17)$$

When R', G', and B' are negative values, absolute values are used and −1 is multiplied before adding 0.1.

Next, a, b, and h are calculated.

$$a = R'_a - 12G'_a/11 + B'_a/11 \quad (18)$$

$$b = (1/9)(R'_a + G'_a - 2B'_a) \quad (19)$$

$$h = \tan^{-1}(b/a) \quad (20)$$

$$h_r = h \cdot 180/\pi \quad (22)$$

$h = h_r$ if $a \geq 0, b \geq 0$ $h = h_r + 180$ if $a < 0, b \geq 0$ $h = h_r + 180$ if $a < 0, b < 0$ $$h = h_r + 360 \text{ if } a \geq 0, b < 0 \quad (23)$$

Next, $e_t$ is calculated.

$$e_t = 1/4\left[\cos\left(h\frac{\pi}{180} + 2\right) + 3.8\right] \quad (24)$$

Next, A is calculated.

$$A = [2R'_a + G'_a + (1/20)B'_a - 0.305]N_{bb} \quad (25)$$

Next, lightness J is calculated.

$$J = 100(A/A_W)^{cz} \quad (26)$$

Next, t is calculated for a calculation of C.

$$t = \frac{(50000/13)N_c N_{cb} e_t \sqrt{a^2 + b^2}}{R'_a + G'_a + (21/20)B'_a} \quad (27)$$

Chroma C is calculated.

$$C = t^{0.9}\sqrt{J/100}(1.64 - 0.29^n)^{0.73} \quad (28)$$

As given above, lightness J, chroma C and hue angle h are calculated.

Next, tristimulus values when the lightness J, chroma C and hue angle h calculated above are observed in different environments is calculated by means of an inverse transform.

First, i that results in $h_i \leq h' \leq h_{i+1}$ is selected from the following table, and its corresponding $h_i$, $e_i$, and $H_i$ are obtained.

|   | Red | Yellow | Green | Blue | Red |
|---|---|---|---|---|---|
| I | 1 | 2 | 3 | 4 | 5 |
| $h_i$ | 20.14 | 90.00 | 164.25 | 237.53 | 380.14 |
| $e_i$ | 0.8 | 0.7 | 1.0 | 1.2 | 0.8 |
| $H_i$ | 0.0 | 100.0 | 200.0 | 300.0 | 400.0 |

$$h' = \frac{(H - H_i)(e_{i+1}h_i - e_i h_{i+1}) - 100 h_i e_{i+1}}{(H - H_i)(e_{i+1} - e_i) - 100 e_{i+1}} \quad (29)$$

$$h = (h' - 360) \text{ if } h' > 360, \text{ otherwise } h = h' \quad (30)$$

t, e, $p_1$, $p_2$, and $p_3$ are calculated.

$$t = \left(\frac{C}{\sqrt{J/100}(1.64 - 0.29^n)^{0.73}}\right)^{\frac{1}{0.9}} \quad (31)$$

When t is 0, a and b are 0, and $p_2$ only is calculated.

$$e_t = 1/4\left(\cos\left(h\frac{\pi}{180} + 2\right) + 3.8\right) \quad (32)$$

$$A = A_W(J/100)^{\frac{1}{cz}} \quad (33)$$

$$p_1 = \frac{(50000/13)N_c N_{cb} e_t}{t} \quad (34)$$

$$p_2 = (A/N_{bb}) + 0.305 \quad (35)$$

$$p_3 = 21/20 \quad (36)$$

a and b are calculated.

$$h_r = h\frac{\pi}{180} \quad (37)$$

if $|\sin(h_r)| \geq |\cos(h_r)|$ $$p_4 = p_1/\sin(h_r) \quad (38)$$

$$b = \frac{p_2(2 + p_3)(460/1403)}{p_4 + (2 + p_3)(220/1403)[\cos(h_r)/\sin(h_r)] - (27/1403) - p_3(6300/1403)} \quad (39)$$

$$a = b[\cos(h_r)/\sin(h_r)] \quad (40)$$

if $|\sin(h_r)| < |\cos(h_r)|$ $$p_5 = p_1/\cos(h_r) \quad (41)$$

$$a = \frac{p_2(2 + p_3)(460/1403)}{p_5 + (2 + p_3)(220/1403) - [(27/1403) - p_3(6300/1403)][\sin(h_r)/\cos(h_r)]} \quad (42)$$

$$b = a[\sin(h_r)/\cos(h_r)] \quad (43)$$

$$R'_a = \frac{460}{1403}p_2 + \frac{451}{1403}a + \frac{288}{1403}b \quad (44)$$

$$G'_a = \frac{460}{1403}p_2 - \frac{891}{1403}a - \frac{261}{1403}b \quad (45)$$

$$B'_a = \frac{460}{1403}p_2 - \frac{220}{1403}a - \frac{6300}{1403}b \quad (46)$$

R', G', and B' are calculated.

$$R' = \frac{100}{F_L}\left(\frac{27.13|R'_a - 0.1|}{400 - |R'_a - 0.1|}\right)^{\frac{1}{0.42}} \quad (47)$$

$$G' = \frac{100}{F_L}\left(\frac{27.13|G'_a - 0.1|}{400 - |G'_a - 0.1|}\right)^{\frac{1}{0.42}} \quad (48)$$

$$B' = \frac{100}{F_L}\left(\frac{27.13|B'_a - 0.1|}{400 - |B'_a - 0.1|}\right)^{\frac{1}{0.42}} \quad (49)$$

If any one of (R'a−0.1), (G'$_a$−0.1), or (B'$_a$−0.1) is a negative value, the corresponding R', G', or B' is also a negative value. $R_C$, $G_C$, and $B_C$ are calculated.

$$\begin{pmatrix} R_c \\ G_c \\ B_c \end{pmatrix} = M_{CAT02} \cdot M_{HPE}^{-1} \cdot \begin{pmatrix} R' \\ G' \\ B' \end{pmatrix} \quad (50)$$

$$M_{HPE}^{-1} = \begin{pmatrix} 1.910197 & -1.112124 & 0.201908 \\ 0.370950 & 0.629054 & -0.000008 \\ 0.000000 & 0.000000 & 1.000000 \end{pmatrix} \quad (51)$$

Finally, RGB and XYZ are calculated.

$$R = \frac{R_c}{(Y_W D / R_W + 1 - D)} \quad (52)$$

$$G = \frac{G_c}{(Y_W D / G_W + 1 - D)} \quad (53)$$

$$B = \frac{B_c}{(Y_W D / B_W + 1 - D)} \quad (54)$$

$$\begin{pmatrix} X \\ Y \\ Z \end{pmatrix} = M_{CAT02}^{-1} \begin{pmatrix} R \\ G \\ B \end{pmatrix} \quad (55)$$

From the above calculations, the tristimulus values XYZ that reflect the visual effect of the second observation environment can be obtained.

SUMMARY OF THE INVENTION

An image processing system according to the embodiment of the present invention comprises an image data acquisition unit for acquiring captured image data, a first image processing unit for performing first image processing relating to color correction and gradation correction on the image data, a second image processing unit for performing second image processing relating to color correction based on a Color Appearance Model on the image data, a parameter calculation unit for calculating an image processing parameter used in the first image processing from the image data before the second image processing and the image data after the second image processing, and a control unit for setting the image processing parameter to the first image processing unit.

An imaging system according to the embodiment of the present invention comprises an image pickup device for generating image data by means of receiving an optical image of a subject and converting the optical image into an electrical signal; a first image processing unit for performing first image processing relating to color correction and gradation correction on the image data; a second image processing unit for performing second image processing relating to color correction based on a Color Appearance Model on the image data; a parameter calculation unit for calculating an image processing parameter used in the first image processing from the image data before the second image processing and the image data after the second image processing; and a control unit for setting the image processing parameter to the first image processing unit, a display unit for displaying an image on which the first or second image processing is performed, and a record unit for recording an image on which the first or second image processing is performed.

A microscope imaging system according to the embodiment of the present invention comprises a microscope; an image pickup device for generating image data by means of receiving an optical image from the microscope and converting the optical image into an electrical signal; a first image processing unit for performing first image processing relating to color correction and gradation correction on the image data; a second image processing unit for performing second image processing relating to color correction based on a Color Appearance Model on the image data; a parameter calculation unit for calculating an image processing parameter used in the first image processing from the image data before the second image processing and the image data after the second image processing; and a control unit for setting the image processing parameter to the first image processing unit, a display unit for displaying an image on which the first or second image processing is performed, and a record unit for recording an image on which the first or second image processing is performed.

BRIEF DESCRIPTION OF THE DRAWINGS

FIG. 5 shows data of FIG. 4 graphed in a grid, width 10 on a side, to create a meshed pattern, and the distribution of the frequency of plotted data in each square;

FIG. 7 is a block diagram of an overview of a configuration of an image processing system and a microscope imaging system according to the second embodiment;

FIG. 8 is a block diagram of an overview of a configuration of the microscope imaging system according to the third embodiment.

DESCRIPTION OF THE PREFERRED EMBODIMENTS

Figure 1:
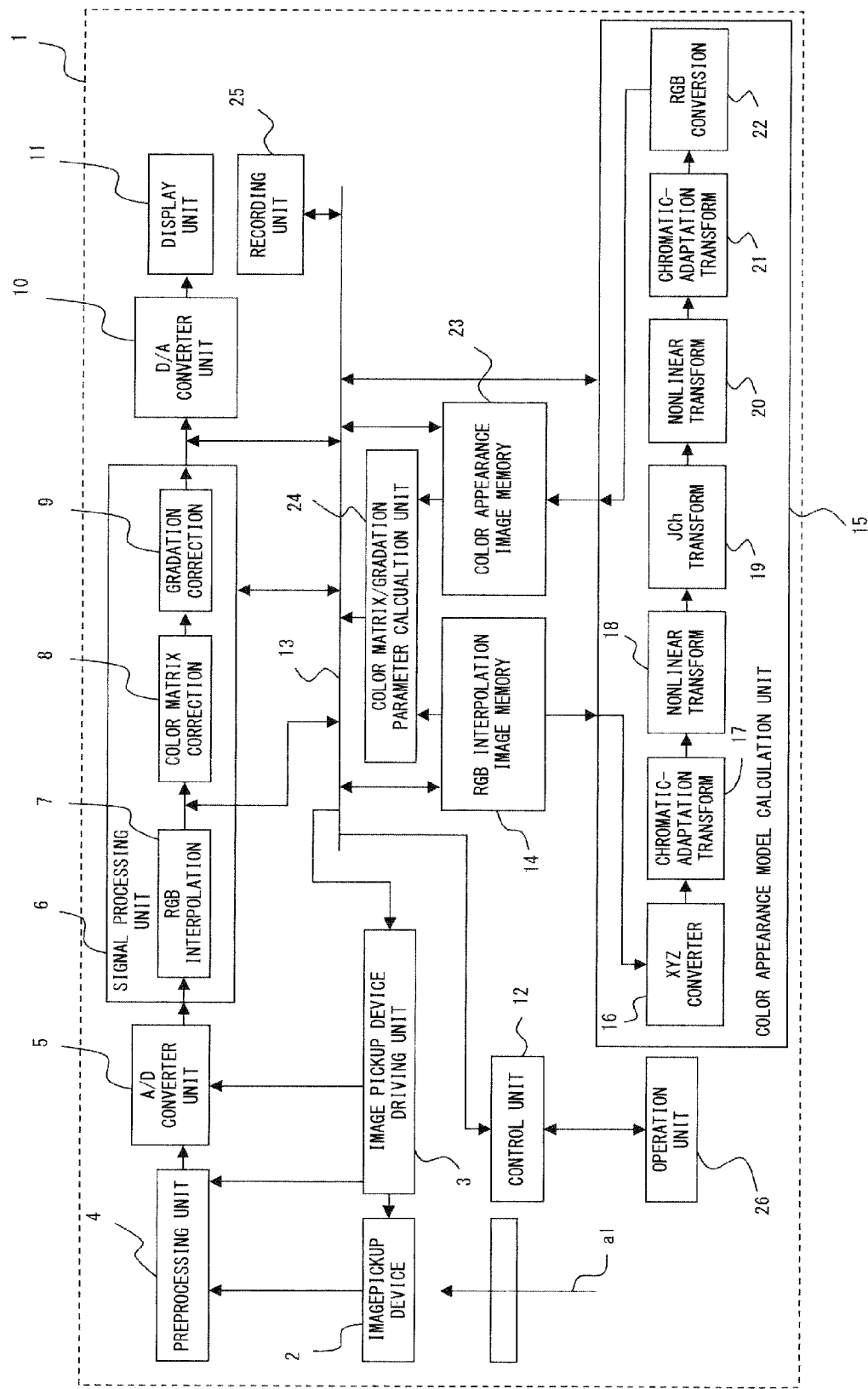
FIG. 1 is a block diagram illustrating an overview of a configuration of an image processing system and an imaging system having the image processing system according to the first embodiment.

The image processing system according to the present invention has an image data acquisition unit, a first image processing unit, a second image processing unit, a parameter calculation unit, and a control unit.

The image data acquisition unit is for acquiring captured image data. The image data acquisition unit corresponds to, in this example, a signal processing unit 6 in the following embodiment.

A first image processing unit performs first image processing that relates to color correction and gradation correction on the image data. The first image processing unit corresponds to, in this example, color conversion matrix correction and gradation correction 9 in the signal processing unit 6 in the following embodiment.

A second image processing unit performs second image processing that relates to color correction based on the Color Appearance Model on the image data. The second image processing unit corresponds to, in this example, a Color Appearance Model unit calculation unit 15 in the following embodiment.

A parameter calculation unit calculates image processing parameters that are used for the first image processing on the basis of image data before applying the second image processing and image data after applying the second image processing. The parameter calculation unit corresponds to, in this example, a color matrix/gradation parameter calculation unit 24 in the following embodiment.

A control unit sets the image processing parameters to the first image processing unit. The control unit corresponds to, in this example, a control unit 12 in the following embodiment.

By using the above units, parameters are calculated in the first image processing unit, which requires easier and more approximate calculation, to realize correction on the basis of the Color Appearance Model, which requires a large amount of calculation that is performed in the second image processing unit, and the parameters are set to the first image processing unit. As a result, real-time image processing based on the Color Appearance Model can be performed.

At that time, the image data before applying the second image processing is RGB image data. The image data after applying the second image processing is Color Appearance image data. The parameter calculation unit compares the RGB image data with the Color Appearance image data. The parameter calculation unit calculates, as the image processing parameters, a calculation of color matrix information used in the color correction in the first image processing and gradation parameters used in the gradation correction.

As a result, the color matrix information and the gradation parameters are calculated as image processing parameters.

When the acquired image is displayed in real time, the image is displayed after the first image processing of the first image processing unit on the basis of the image processing parameters. When the acquired image is recorded, the image is recorded after the second image processing of the second image processing unit.

As a result, moving images and still images that are corrected on the basis of the Color Appearance Model can be displayed in a display unit or recorded in a recording unit.

Details of the embodiments of the present invention are provided below.

<First Embodiment>

As shown in the formulae above, in the technique based on the CIECAM02, matrix operation and nonlinear operation are repeated. For that reason, processing of image data acquired in an image pickup device requires a large amount of calculation and takes long time.

The present embodiment provides an image processing system, an imaging system, and a microscope imaging system that can reproduce the visual quality of a subject precisely and that can process image data acquired from an image pickup device in real time or in a relatively short time.

The following image processing system is explained as the present embodiment. When recording moving images, the image processing system performs the color matrix correction/gradation correction of Color Appearance Model operation that is approximated in accordance with the subject on the moving images. As a result, the visual quality of the moving images can be approximately and precisely reproduced. In addition, the processing is performed in a relatively short time.

FIG. 1 is a block diagram illustrating an overview configuration of an image processing system and an imaging system having the image processing system according to the first embodiment of the present invention.

In FIG. 1, a numerical reference 1 indicates the imaging system to which a subject image captured by a lens not shown in the drawing enters along an optical path a1. An image pickup device 2 such as CCD is placed as an image pickup unit at a position where the subject image is projected.

The image pickup device 2 is driven in an exposure time on the basis of a driving signal from an image pickup device driving unit 3 and outputs an output signal to a preprocessing unit 4. The preprocessing unit 4 converts the output signals from the image pickup device 2 into video signals and outputs the signals to an A/D converter unit 5 by means of control pulses provided from the image pickup device driving unit 3. The A/D converter unit 5 digitalizes the signals from the preprocessing unit 4 on the basis of clock signals from the image pickup device driving unit 3.

The video signals digitalized in the A/D converter unit 5 are input into the signal processing unit 6. The signal processing unit 6 performs signal processing such as RGB interpolation 7, color correction based on a color conversion matrix 8, and gradation correction 9 of the input video signals. The signals output from the signal processing unit 6 are converted into analog signals by a D/A converter unit 10, and displayed in a display unit 11 as moving images.

Meanwhile, in accordance with the instructions from the control unit 12, the image data after applying the RGB interpolation 7 in the signal processing unit 6 is stored in an RGB interpolation image memory 14.

The image is sent further to a Color Appearance Model calculation unit 15, and is converted into an XYZ image in an XYZ converter unit 16.

The XYZ converter unit 16 converts RGB images captured in CCD into tristimulus value XYZ images by means of matrix operation. The matrix can be calculated from color patches illuminated by illumination light. Color characteristics of the color patches are known and characteristics of the illumination light are also known.

Chromatic-adaptation transform is applied to the XYZ images converted in the XYZ converter unit 16 in a chromatic-adaptation unit 17. The operation in the transform is the same as in equation (1) through equation (6) of the conventional art. Nonlinear transform is, then, applied to the chromatic-adaptation-transformed image data in a nonlinear transform unit 18. The operation in this transform is the same as in equation (12) through equation (17) of the conventional art.

Next, the image data transformed in the nonlinear transform unit 18 is converted with JCh transform in a JCh transform unit 19. The operation is the same as in equation (18) through equation (28) of the conventional art.

The image data transformed in the JCh transform unit 19 is further nonlinearly transformed in a nonlinear transform unit 20. The operation is the same as in equation (31) thorough equation (49) of the conventional art.

Chromatic-adaptation transform is further applied to the image data transformed in the nonlinear transform unit 20 in a chromatic-adaptation transform unit 21 and is converted into XYZ image data. The operation is the same as in equation (50) through equation (55) of the conventional art. The XYZ image data converted with chromatic-adaptation transform in chromatic-adaptation transform unit 21 is converted into RGB data in an RGB conversion unit 22. If the display unit is an sRGB standard monitor, for example, the RGB data is obtained from the following operations.

$$\begin{pmatrix} R \\ G \\ B \end{pmatrix} = \begin{pmatrix} 3.2406 & -1.5372 & -0.4986 \\ -0.9689 & 1.8758 & 0.0415 \\ 0.0557 & -0.2040 & 1.0570 \end{pmatrix} \begin{pmatrix} X \\ Y \\ Z \end{pmatrix} \quad (56)$$

If R,G,B≦0.03108

$$R'_{sRGB} = 12.92 \times R$$

$$G'_{sRGB} = 12.92 \times G \quad (57)$$

$$B'_{sRGB} = 12.92 \times B$$

else if R,G,B>0.0031308

$$R'_{sRGB} = 1.055 \times R^{(1.0/2.4)} - 0.055$$

$$G'_{sRGB} = 1.055 \times G^{(1.0/2.4)} - 0.055 \quad (58)$$

$$B'_{sRGB} = 1.055 \times B^{(1.0/2.4)} - 0.055$$

$$R_{8bit} = \text{round}(255.0 \times R'_{sRGB})$$

$$G_{8bit} = \text{round}(255.0 \times G'_{sRGB})$$

$$B_{8bit} = \text{round}(255.0 \times B'_{sRGB})$$

Luminance information, white color information, background information, and surround information of the first observation environment at the time of image capture, and luminance information, white color information, background information, and surround information of the second observation environment are input from an operation unit 26 to the control unit 12. The second observation environment is an environment in which scenes displayed in a display unit 25 are observed with the human eye. Parameters in each unit of the Color Appearance Model unit calculation unit 15 can be set on the basis of the instruction from the control unit 12.

Meanings of each piece of the environment information and its corresponding parameter are provided below.

First Environment (at the Time of Image Capture)
  Luminance information: $L_A$ average luminance of the scenes of the image subject and its surrounding
  White color information: $X_W Y_W Z_W$ tristimulus values of reference white color of the image subject
  Background information: $Y_b$ luminance of the background of the image subject
  Surround information: category names determined on the basis of the ratio of the luminance of the image subject to the luminance of its surroundings: three categories, Average, Dim, and Dark, are represented
Second Environment (at the Time of Observation)
  Luminance information: $L_A$ average luminance of the scenes of the observed subject and its surrounding
  White color information: $X_W Y_W Z_W$ tristimulus values of reference white color of the observed subject
  Background information: $Y_b$ luminance of the background of the observed subject
  Surround information: category names determined based on the ratio of the luminance of the observed subject to the luminance of its surroundings: three categories, Average, Dim, and Dark, are represented The first environment parameters are parameters used in the calculation in the chromatic-adaptation transform unit 18, the nonlinear transform unit 19, and the JCh transform unit 20. The second environment parameters are parameters used in the calculation in the nonlinear transform unit 20 and chromatic-adaptation transform unit 21.

The image data output from the Color Appearance Model calculation unit 15 is stored in a Color Appearance image memory 23.

Figure 2:
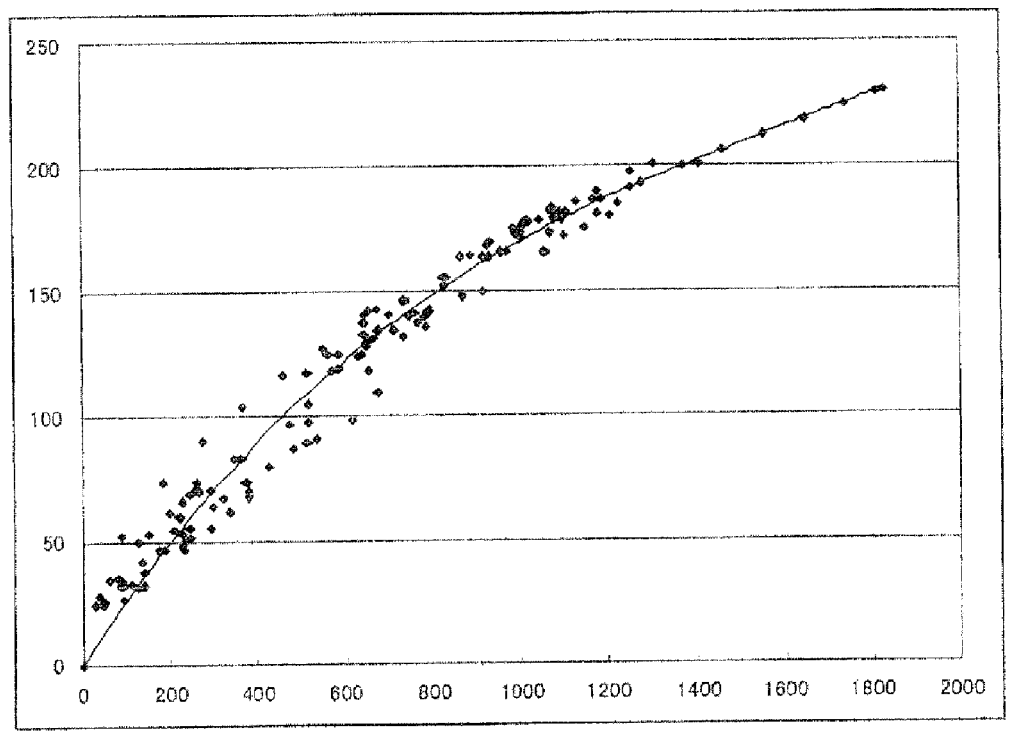
FIG. 2 shows a correlation between luminance signals of RGB interpolation image data (x-axis) and luminance signals of Color Appearance image data (y-axis)

The color matrix/gradation parameter calculation unit 24 compares the RGB interpolation image data stored in the RGB interpolation image memory 14 with the Color Appearance image data stored in the Color Appearance image memory 23. The color matrix/gradation parameter calculation unit 24 calculates a color matrix used in the color matrix correction unit 8 of the signal processing unit 6 and gradation parameters used in the gradation correction unit 9. An example of the calculation is that the gradation correction data is obtained from comparison between luminance values of a pixel that is common to both of the RGB interpolation image data and the Color Appearance image data. When the luminance signal of the RGB interpolation image data is on x-axis ($Y_{x,y} = 0.3 R_{x,y} + 0.59 G_{x,y} + 0.11 B_{x,y}$) and the luminance signal of the Color Appearance image data is on y-axis ($Y'_{x,y} = 0.3 R'_{x,y} + 0.59 G'_{x,y} + 0.11 B'_{x,y}$), the correlation shown in FIG. 2 can be obtained. An approximate line of this distribution is calculated. The calculated approximate line is set to the gradation correction unit as gradation correction data.

Figure 3:
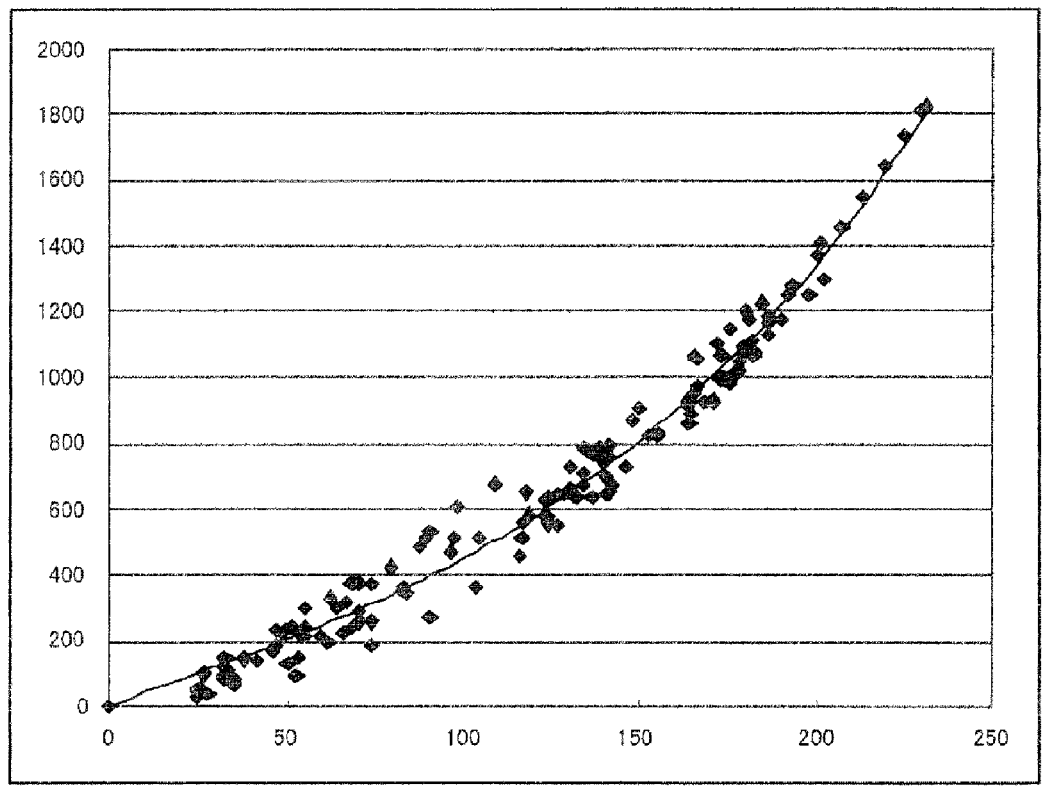
FIG. 3 shows a correlation between luminance signals of Color Appearance image data (x-axis) and luminance signals of RGB interpolation image data (y-axis)

Furthermore, when the luminance signal of the Color Appearance image data is on the x-axis and the luminance signal of the RGB interpolation image data is on the y-axis, the correlation shown in FIG. 3 can be obtained. An approximate line of this distribution is calculated. Gradation conversion of the Color Appearance image data is performed by using the calculated approximate line.

The RGB interpolation image data is represented by RGBin and the gradation-converted Color Appearance image data is represented by RGBout. The color matrix M to be calculated has a relation of $$RGBout = M \cdot RGBin$$

RGBout and RGBin indicate RGB data of each pixel, and are represented by a 3×n matrix as below.

$$RGBin = \begin{pmatrix} R_{0,0} & R_{0,1} & R_{0,2} & \ldots & R_{1,0} & R_{1,1} & R_{1,2} & \ldots & R_{x,y} & \ldots \\ G_{0,0} & G_{0,1} & G_{0,2} & \ldots & G_{1,0} & G_{1,1} & G_{1,2} & \ldots & G_{x,y} & \ldots \\ B_{0,0} & B_{0,1} & B_{0,2} & \ldots & B_{1,0} & B_{1,1} & B_{1,2} & \ldots & B_{x,y} & \ldots \end{pmatrix}$$

$$RGBout = \begin{pmatrix} R'_{0,0} & R'_{0,1} & R'_{0,2} & \ldots & R'_{1,0} & R'_{1,1} & R'_{1,2} & \ldots & R'_{x,y} & \ldots \\ G'_{0,0} & G'_{0,1} & G'_{0,2} & \ldots & G'_{1,0} & G'_{1,1} & G'_{1,2} & \ldots & G'_{x,y} & \ldots \\ B'_{0,0} & B'_{0,1} & B'_{0,2} & \ldots & B'_{1,0} & B'_{1,1} & B'_{1,2} & \ldots & B'_{x,y} & \ldots \end{pmatrix}$$

Here, n is the number of pixels of an input image when all pixels of the input image are considered.

It is also possible to limit the number of n by extracting representative colors in the image. For example, plotting of the RGB interpolation image data in B-Y and R-Y space appears as shown in FIG. 4.

Figure 4:
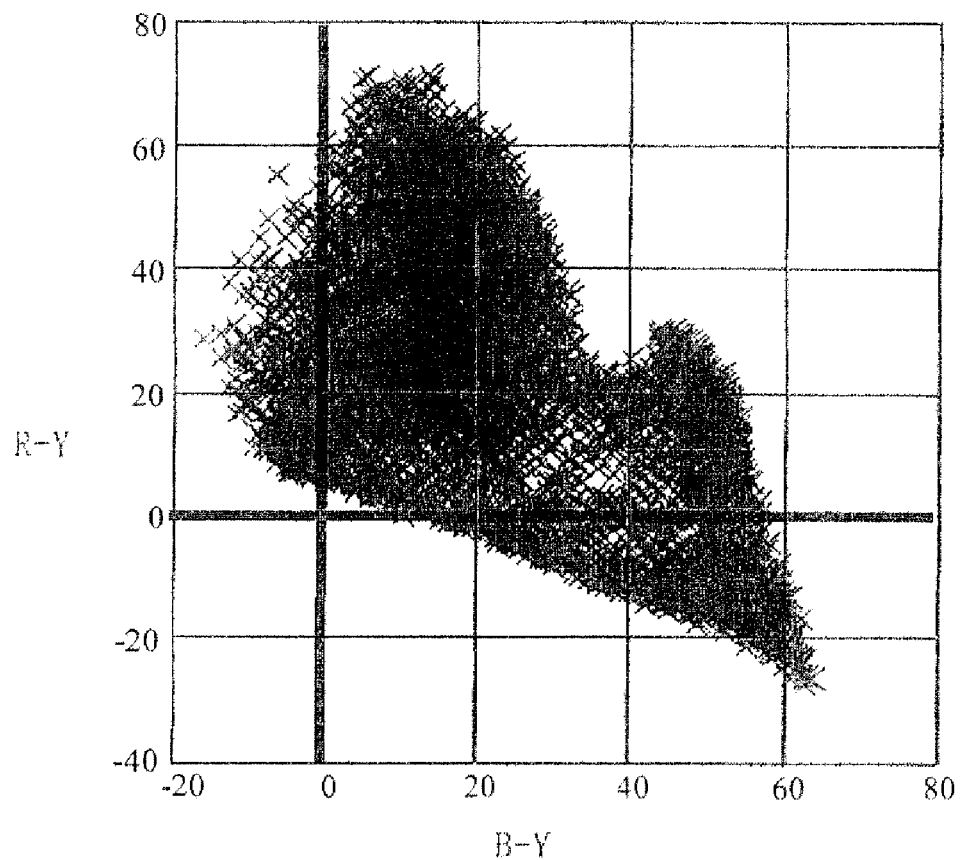
FIG. 4 shows the RGB interpolation image data plotted in B-Y and R-Y space.

In FIG. 4, x-axis-y-axis space is ruled in squares, width 10 on a side, to create a meshed pattern, and the frequency of plotted data in each square is obtained. The distribution of the frequency is shown in FIG. 5. It is also possible that by obtaining center colors in every square, the RGB interpolation image data corresponding to the colors and the Color Appearance image data at a coordinate having the colors are selected as representative colors. In the case of FIG. 5, for example, since there are 53 frequently plotted squares n can be limited to 53.

Alternately, rather than simply obtaining the center color in each square, by setting a threshold of the frequency and selecting the squares that have a certain frequency or greater, the center colors of the squares are selected as respective representative colors.

M is calculated on the basis of the above equation.

$$M = RGBout \cdot (RGBin)^{-1}$$

Note that since RGBin is not holomorphic, it is calculated by least-squares estimation.

The color matrix and the gradation parameters, which are calculated in the above manner, are set to the color matrix correction unit 8 and the gradation correction unit 9, respectively, in the signal processing unit 6 via a bus 13, on the basis of the instruction of the control unit 12.

The control unit 12 records the image data from the signal processing unit 6 or the image data from the Color Appearance Model calculation unit 15 in the recording unit 25 as still image data or moving image data via the bus 13.

Next, the workings of the present embodiment are explained.

Figure 6:
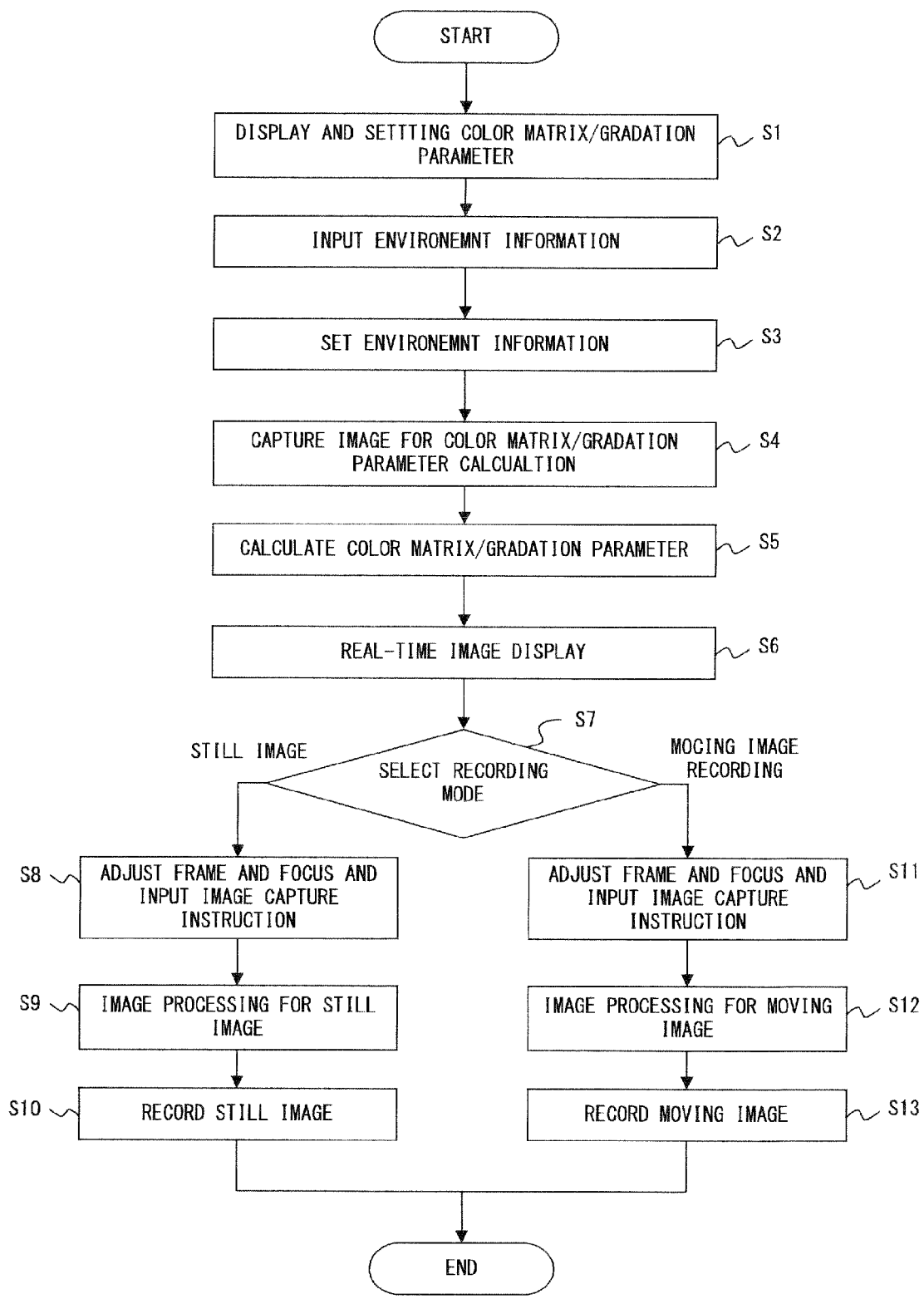
FIG. 6 shows a flow relating to the first embodiment.

FIG. 6 shows a flow relating to the present embodiment. An operator, prior to capturing images of a subject, sends and instruction to set each of the parameters in the color matrix correction unit 8 and the gradation correction unit 9 in the signal processing unit 6 on a setting screen shown by the display unit 11 using the operation unit 26 (S1).

Next, the operator inputs the environment information of the subject and the environment information of the display unit to the operation unit 26 (S2). Upon receiving the input from the operation unit 26, the control unit 12 sets the first and second environment information to the Color Appearance Model calculation unit 15 as described above (S3).

The operator subsequently captures images of the subject for calculation of parameters of the color matrix correction 8 and the gradation correction 9 (S4).

After the RGB interpolation processing 7, the images are stored in the RGB interpolation image memory 14 via the bus 13. After the calculation in the Color Appearance Model calculation unit 15, as described above, the images are stored in the Color Appearance image memory 23. In the color matrix/gradation parameter calculation unit 24, the color matrix and gradation parameters are calculated and set (S5).

A subject image intended by the operator is displayed in the display unit 11, and the subject image is processed by using the color matrix and gradation parameters set in real time (S6).

The operator, next, selects a still image record or a moving image record (S7). If a still image record is selected, the operator adjusts the framing and the focus when aimed at an intended subject, and inputs a still image capture instruction to the operation unit 26 (S8).

Upon receiving the input from the operation unit 26, the control unit 12 sends the image after RGB interpolation processing 7 to the RGB interpolation image memory 14. The image is calculated in the Color Appearance Model calculation unit 15 (S9). The calculated image is stored in the Color Appearance image memory 23 and is recorded in the recording unit 25 via the bus 13 (S10).

When a moving image is selected, on the other hand, the operator adjusts the framing and the focus when aimed at an intended subject, and inputs a moving image capture instruction to the operation unit 26 (S11).

Upon receiving the input from the operation unit 26, the control unit 12 performs RGB interpolation 7, color matrix correction 8, and gradation correction 9 in the signal processing unit 6 (S12). Via the bus 13, the control unit 12 records the corrected data to the recording unit 25 as moving image data (S13). Then, the image capture operation is completed.

As explained above, Color Appearance Model calculation is performed by using approximate color matrix correction and gradation correction in accordance with the subject. For that reason, the visual quality of the moving images can be approximately and precisely reproduced, and, in addition, processing precisely reflecting the color appearance calculation can be performed on still images.

In the embodiment above, in a case of recording a moving image, an image processing in the signal processing unit 6 is recorded. However, the present invention is not limited to this manner. For example, a moving image of the RGB interpolated image after RGB interpolation processing 7 can be recorded once in the recording unit 25. Each of the images constituting the moving image is, afterwards, processed in the Color Appearance Model calculation unit 15 and a moving image can be reconstructed from these processed images and is recorded again.

According to this modification, although the real-time feature of the moving image is reduced, moving images processed with a further precise Color Appearance Model can be obtained.

<Second Embodiment>

In this embodiment, a case in which the first embodiment is applied to the microscope imaging system is explained.

FIG. 7 is a block diagram of overview configurations of an image processing system and a microscope imaging system according to the second embodiment of the present invention. In FIG. 7, the same reference numbers are assigned to the units that are the same as units in FIG. 1.

In the present embodiment, an imaging system is attached to a microscope 31. The Color Appearance Model calculation unit 15, the color matrix/gradation parameter calculation unit 24, the RGB interpolation image memory 14, and the Color Appearance image memory 23 are provided in a personal computer (hereinafter abbreviated as PC) 32. The PC 32 has a monitor 33. The PC 32 also has display, record, and operation functions that are the same as the imaging system in FIG. 1.

In FIG. 7, the reference number 31 represents a body of the microscope. The microscope body 31 allows visual observation of an observed image of a sample, which is not shown in the drawing, and can output the observed image to the outside along an observation optical path a1. On the observation optical path a1 outside of the microscope body 31, an image sensing device 2 such as CCD is placed as an image capture unit at a position where the observed image is projected from the microscope body 31.

The microscope 31 has a transmissive illumination light source 34, a mirror 35, a lens 36, a field stop 37, an aperture stop 38, a condenser lens 39, a stage 40, object lenses 41, an object revolver 42, an epi-illumination light source 43, fluorescent cubes 44, a turret 45, a trinocular lens barrel 46, an eye lens 47, and a camera adapter 48. The object lenses 41 are set in the object revolver 42. The fluorescent cubes 44 are set in the turret 45.

The trinocular lens barrel 46 allows selection of the following optical paths: an optical path for outputting 100% to the eye lens 47, an optical path for assigning 50% to the eye lens 47 and another 50% to the camera adaptor 48, or an optical path for outputting 100% to the camera adaptor 48.

The transmissive illumination light source 34, the field stop 37, the aperture stop 38, the object revolver 42, the epi-illumination light source 43, the turret 45, and the trinocular lens barrel 46 are connected to the PC 32. The PC 32 can detect the state of these connected devices. Note that the transmissive illumination light source 34, the field stop 37, the aperture stop 38, the object revolver 42, the epi-illumination light source 43, the turret 45, and the trinocular lens barrel 46 can be electrically driven, and operations of these devices can be controlled by the PC 32.

Next, the effect of the present embodiment is explained. In the present embodiment, the first environment information is calculated and set in accordance with the setting of the microscope 31 and the observation method of a sample. In order to calculate the first environment information, the setting information corresponding to the microscope setting is recorded in advance.

When transmissive bright field observation is selected, the color and luminance of the light source are obtained from the setting voltage in the transmissive illumination light source 34. If the light source is a halogen lamp, and an infrared cut filter and a light balance filter (not shown in the drawing) are provided in the optical path, the luminance obtains the state described below in accordance with the voltage value of the light source. When the light source voltage is 6V, $X_W Y_W Z_W = (4.47, 4.57, 2.72)$. When the light source voltage is 9V, $X_W Y_W Z_W = (24.9, 25.9, 20.1)$. When the light source voltage is 12V, $X_W Y_W Z_W = (61.6, 65.3, 61.7)$.

Next, the transmissive illumination light described above is corrected in accordance with the aperture diameter of the aperture stop 38, the object lens 41, and the optical path setting of the trinocular lens barrel 46. In a case of the transmissive bright field observation of the microscope 31, the illumination light itself is observed in the part where the sample is not present. Accordingly, the background $Y_b$ of the first environment should be the corrected transmissive illumination light. In addition, the corrected transmissive illumination light itself can be the white color information.

Next, the aperture diameter of the field stop 38 is compared with the observation field. If the diameter of the field stop is greater than the field, the size of the observation field is selected. If the diameter of the field stop is smaller than the observation field, the diameter of the field stop is selected. The luminance information of the first environment is calculated from a ratio of the selected diameter to the field range observed from the eye lens 47 and the luminance of the corrected illumination light.

In a case of the microscope 31, when the sample is observed through the eye lens 47, the surrounding of the observation image is black. In this case, the surround information of the first environment information can be set as Dark.

As the environment information of the second environment, as with the first embodiment, environment information of the environment in which the display 33 of the PC 32 is placed is input.

Calculation/setting of the color matrix/gradation parameters, moving image recording, and still image recording are the same as those of the first embodiment.

When the fluorescent observation is selected, the luminance of the scene and the luminance of the background in a field of the eye lens 47 are calculated from the optical path setting of the trinocular lens barrel 46 and from the image, exposure time, and gain obtained in the imaging system 30. In the fluorescent observation, since white color is not present in the first environment, a white color that is a reference at the time of bright field observation is set. For example, $X_W Y_W Z_W = (24.9, 25.9, 20.9)$ is set as a reference white by applying a 9V voltage to the halogen lamp and by using the light balance filter. Since the surrounding of the observation image is black like the bright field, the surround information of the first environment is set as Dark.

According to the present embodiment, the environment information can be calculated and set from the setting information of the microscope 31, facilitating the operations of the operator.

<Third Embodiment>

In the present embodiment, the environment information of the second environment is set in accordance with the display environment when observing the image with PC or projectors.

FIG. 8 is a block diagram of an overview configuration of the microscope imaging system according to the third embodiment of the present invention. In the present embodiment, a projector 53 is connected to a PC 51 that controls the imaging system. In addition, a plurality of PCs 55, 57, and 59 are connected to the PC 51 via a network 54.

Figure 9:
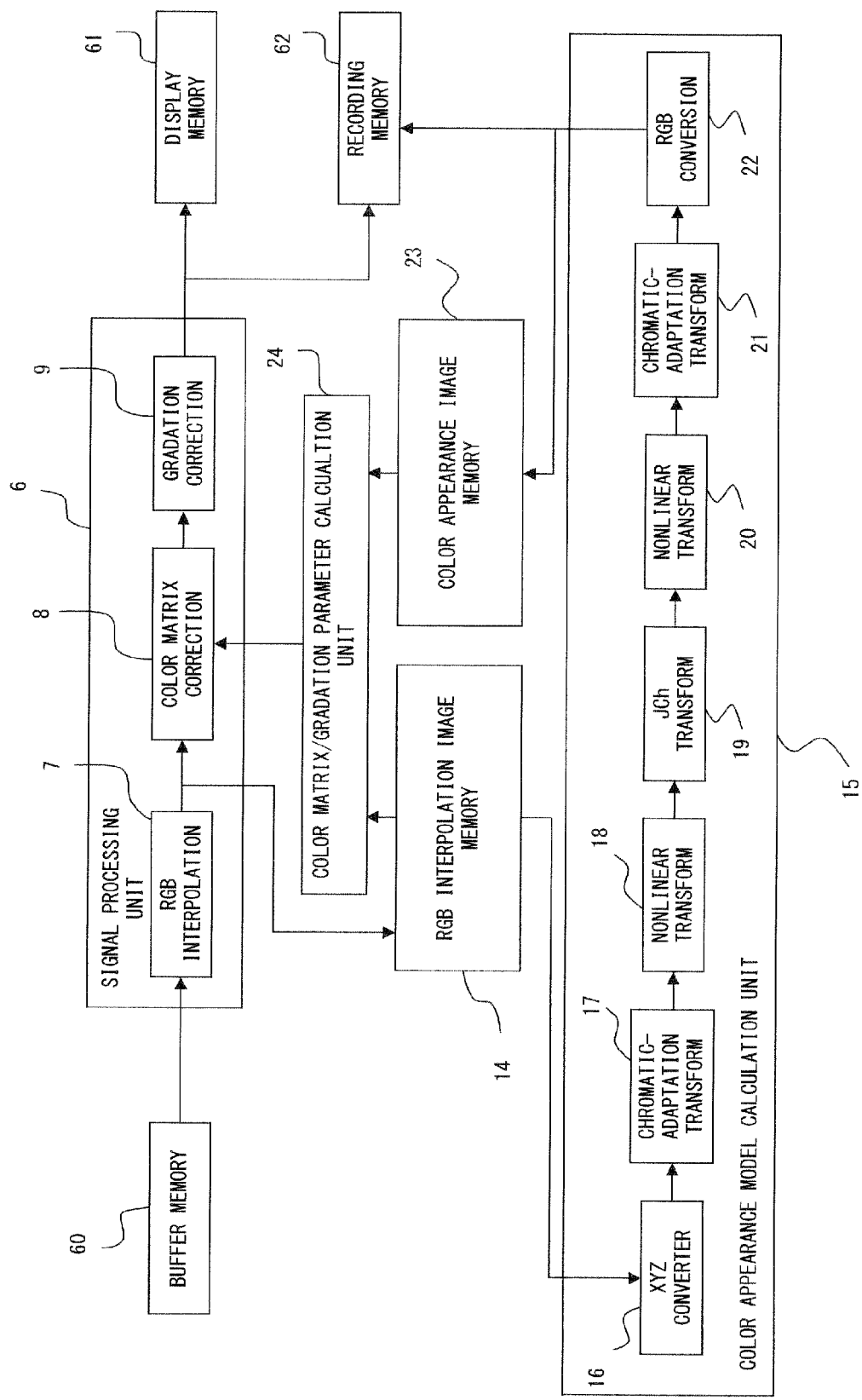
FIG. 9 is a block diagram of the image processing program that is installed in each PC in the microscope imaging system according to the third embodiment.

FIG. 9 is a block diagram of the image processing program that is installed in each PC in the microscope imaging system according to the third embodiment of the present invention. From an imaging device body 50, RAW data is output via an I/F 27, and all image processing is executed in the PC 51. There are two types of image processing programs shown in FIG. 9 programmed in the PC 51 that controls the imaging system. For that reason, the PC 51 can set different second environments separately to the monitor 52 and the projector 53.

Each of the PCs connected to the network has one type of the image processing programs shown in FIG. 9 installed. The RAW data is input via the PC 51 that controls the imaging system and the network 54.

When the RAW data is input in the PC 51, 55, 57, and 59, it is stored in buffer memory 60. Afterwards, processing is executed in the signal processing unit 6 and in the Color Appearance Model calculation unit 15, which is similar to the first and second embodiments. The processed image data is stored in display memory 61 or recording memory 62.

Such a constitution allows input of the environment information of the second environment in accordance with the display environment when observing the image with a PC or projectors. As a result, processing based on the Color Appearance Model, calculation and setting of the color matrix/gradation parameters, and processing, recording and displaying of moving/still images are executed in the same manner as those in the first and second embodiments.

The present embodiment allows image processing based on the Color Appearance Model in accordance with the environment where PC or projectors are placed. For that reason, images with a high visual quality can be displayed.

As described above, the image processing system according to the embodiments of the present invention has the first image processing unit and the second image processing unit. The first image processing unit corrects color and gradation. The second image processing unit executes correction based on the Color Appearance Model. Such a constitution allows the image processing system to calculate and set image processing parameters of the first image processing unit based on the input image data and the output image data of the second image processing unit.

In the above image processing system, the first image processing unit performs image processing for real-time display and the second image processing unit performs image processing for recording.

Such a constitution allows for easier calculation and setting of parameters in an approximate manner in the first image processing unit so as to realize a correction in the second image processing unit on the basis of the Color Appearance Model that requires a large amount of calculation. As a result, image processing reflecting the Color Appearance Model can be performed in real time.

The above image processing system can be an imaging system or a microscope imaging system. At this time, the output image of the first image processing unit can be displayed in the display unit or recorded in the recording unit as a moving image. The output image of the second image processing unit can be displayed in the display unit or recorded in the recording unit as a still image.

Such a constitution allows displaying in the display unit or recording in the recording unit of moving images and still images corrected on the basis of the Color Appearance Model.

In the above imaging system or in the microscope, images recorded in the recording unit as moving images are processed in the second image processing unit. Afterwards, the recoded images are reconstructed as moving images and reproduced in the display unit.

Such a constitution allows recording/reproduction of moving images processed to perform correction based on the Color Appearance Model.

Here, the first observation environment is an observation environment in which scenes captured by image pickup device are observed by the human eye. The second observation environment is an environment in which scenes displayed in a display unit are observed by the human eye. In this case, the correction based on the Color Appearance Model employs luminance information, white color information, background information, and surround information of the first observation environment and luminance information, white color information, background information, and surround information of the second observation environment.

Such a constitution allows the luminance information, white color information, background information, and surround information of the first observation environment and the luminance information, white color information, background information, and surround information of the second observation environment to be reflected in the correction based on the Color Appearance Model. As a result, the correction can be performed so as to be appropriate to the conditions of the observation environment.

The microscope has an object lens, an illumination light source, a condenser lens, an aperture stop, a field stop, and a trinocular lens barrel. The microscope imaging system further has an input unit and a control unit. The input unit inputs in the control unit the setting status of any one of a combination of an object lens, an illumination light source, a condenser lens, an aperture stop, a field stop, and a trinocular lens barrel. The control unit calculates the luminance of scenes observed with the human eye and sets the calculated luminance in the second image processing unit.

Such a constitution allows for calculation of luminance information of the first environment from the setting conditions of the microscope. As a result, the luminance information of the first environment is set to the second image processing unit without a need for special operations by an observer.

The above microscope system further has a control unit. The control unit calculates the luminance of an eye lens observation optical path based on an ocular observation path, optical split information of a camera observation optical path, and setting information of an output image, exposure time and sensitivity of the image pickup device. The control unit also calculates luminance of the scenes observed by the human eye, and sets the luminance in the second image processing unit.

Such a constitution allows for the calculation of luminance of the ocular observation optical path from the setting of an output image, the exposure time, and the sensitivity of the image pickup device and the optical split information. As a result, the luminance information of the first environment can be set to the second image processing unit without the need for special operations by an observer.

The imaging system and microscope imaging system can reflect each observation environment to the correction processing based on the Color Appearance Model.

Such a constitution reflects environment information to the correction processing based on the Color Appearance Model for every observation environment. The precious image corresponding to each observation environment is obtained.

The microscope imaging system can calculate background information of the first environment from the setting conditions of a microscope in bright field observation. The microscope imaging system can also calculate the background information from the average luminance of the captured images in fluorescent observation or dark field observation.

Such a constitution allows for calculation of luminance information of the first environment for each observation method. As a result, the luminance information of the first environment can be set to the second image processing unit without the need for special operations by an observer.

The microscope imaging system can transmit image data as surround information of the first observation environment to a plurality of observation systems after assigning "dark" to the output data.

Such a constitution allows constant transmission of surround information of the first observation environment, which is suitable for the ocular observation environment of the microscope, to the observation system.

The use of the present invention enables precise reproduction of visual quality of the subject and real-time or relatively short-time processing of image data obtained with an imaging device.

It should be noted that the present invention is not limited to the embodiments provided above, but various configuration or embodiments can be made within the scope of the gist of the present invention.

What is claimed is:

1. An image processing system comprising:
   an image data acquisition unit for acquiring captured image data;
   a first image processing unit for performing first image processing relating to color correction and gradation correction on the image data;
   a second image processing unit for performing, on the image data, second image processing relating to color correction based on a Color Appearance Model;
   a parameter calculation unit for calculating an image processing parameter used in the first image processing from the image data before the second image processing and the image data after the second image processing; and
   a control unit for setting the image processing parameter to the first image processing unit.

2. The image processing system according to claim 1, wherein
   the image data before the second image processing is RGB image data,
   the image data after the second image processing is Color Appearance image data, and
   the parameter calculation unit compares the RGB image data with the Color Appearance image data, and calculates, as the image processing parameter, color matrix information used in the color correction and a gradation parameter used in the gradation correction in the first image processing.

3. The image processing system according to claim 2, wherein
when the acquired image is displayed in real time, the first image processing is performed on the image by the first image processing unit on the basis of the image processing parameter,
when the acquired image is recorded, the second image processing is performed on the image by the second image processing unit.

4. An imaging system comprising:
an image pickup device for generating image data by means of receiving an optical image of a subject and converting the optical image into an electrical signal;
a first image processing unit for performing first image processing relating to color correction and gradation correction on the image data;
a second image processing unit for performing, on the image data, second image processing relating to color correction based on a Color Appearance Model;
a parameter calculation unit for calculating an image processing parameter used in the first image processing from the image data before the second image processing and the image data after the second image processing; and
a control unit for setting the image processing parameter to the first image processing unit;
a display unit for displaying an image on which the first or second image processing is performed; and
a record unit for recording an image on which the first or second image processing is performed.

5. The imaging system according to claim 4, wherein
the image data before the second image processing is RGB image data,
the image data after the second image processing is Color Appearance image data, and
the parameter calculation unit compares the RGB image data with the Color Appearance image data, and calculates, as the image processing parameter, color matrix information used in the color correction and a gradation parameter used in the gradation correction in the first image processing.

6. The imaging system according to claim 5, wherein
when the acquired image is displayed in real time, the first image processing is performed on the image by the first image processing unit based on the image processing parameter, and
when the acquired image is recorded, the second image processing is performed on the image by the second image processing unit.

7. The imaging system according to claim 6, wherein
the second image processing unit further extracts a moving image captured by the image pickup device and recorded in the record unit, and after performing the second image processing on each of the images constituting the moving image, reconstructs them as a moving image and outputs the moving image to the display unit.

8. The imaging system according to claim 5, wherein
the correction based on the Color Appearance Model uses luminance information, white color information, background information, and surround information of a first observation environment in which a scene captured by the image pickup device is observed by a human eye, and luminance information, white color information, background information, and surround information of a second observation environment in which a scene displayed with the display unit is observed by a human eye.

9. The imaging system according to claim 8, further comprises
a plurality of observation devices for displaying the captured image, wherein
the second image processing unit performs the second image processing based on the luminance information, white color information, background information, and surround information of the second observation environment in accordance with each of the observation devices.

10. A microscope imaging system, comprising:
a microscope;
an image pickup device for generating image data by means of receiving an optical image from the microscope and converting the optical image into an electrical signal;
a first image processing unit for performing first image processing relating to color correction and gradation correction on the image data;
a second image processing unit for performing, on the image data, second image processing relating to color correction based on a Color Appearance Model;
a parameter calculation unit for calculating an image processing parameter used in the first image processing from the image data before the second image processing and the image data after the second image processing; and
a control unit for setting the image processing parameter to the first image processing unit;
a display unit for displaying an image on which the first or second image processing is performed; and
a record unit for recording an image on which the first or second image processing is performed.

11. The microscope imaging system according to claim 10, wherein
the image data before the second image processing is RGB image data,
the image data after the second image processing is Color Appearance image data, and
the parameter calculation unit compares the RGB image data with the Color Appearance image data, and calculates, as the image processing parameter, color matrix information used in the color correction and gradation parameter used in the gradation correction in the first image processing.

12. The microscope imaging system according to claim 11, wherein
when the acquired image is displayed in real time, the first image processing is performed on the image by the first image processing unit based on the image processing parameter, and
when the acquired image is recorded, the second image processing is performed on the image by the second image processing unit.

13. The microscope imaging system according to claim 12, wherein
the second image processing unit further extracts a moving image captured by the image pickup device and recorded in the record unit, and after performing the second image processing on each of the images constituting the moving image, reconstructs them as a moving image and outputs the moving image to the display unit.

14. The microscope imaging system according to claim 12, wherein
the correction based on the Color Appearance Model uses luminance information, white color information, background information, and surround information of a first observation environment in which a scene captured by the image pickup device is observed by a human eye, and luminance information, white color information, background information, and surround information of a second observation environment in which a scene displayed with the display unit is observed by a human eye.

15. The microscope imaging system according to claim 14, further comprises
an input unit for inputting information on a setting state of any one or a combination thereof of an object lens, an illumination light source, a condenser lens, an aperture stop, a field stop and a trinocular lens barrel provided in the microscope, wherein
the control unit calculates a luminance of a scene observed by a human eye and sets the luminance to the second image processing unit.

16. The microscope imaging system according to claim 15, wherein
the control unit calculates a luminance of an ocular observation optical path from optical split information of the ocular observation optical path and a camera observation optical path relating to the trinocular lens barrel and an output image, exposure time, and sensitivity setting of the image pickup device, calculates a luminance of a scene observed by a human eye, and sets the luminance to the second image processing unit.

17. The microscope imaging system according to claim 16, wherein
the control unit calculates the background information of the first observation environment from the setting state of the microscope in a bright field observation, and calculates the background information of the first observation environment from an average luminance of the acquired image in a fluorescent observation or in a dark field observation.

18. The microscope imaging system according to claim 17, wherein
the control unit constantly sets the surround information of the first observation environment to dark.

19. The microscope imaging system according to claim 17, further comprises
a plurality of observation devices for displaying the captured image, wherein
the second image processing unit performs the second image processing based on the luminance information, white color information, background information, and surround information of the second observation environment in accordance with each of the observation devices.

* * * * *